3,033,662
GASOLINE WITH COPOLYMERIC LEAD STABILIZER AND A SYNERGISTIC MODIFICATION THEREOF

John W. Thompson and James C. Ownby, Kingsport, Tenn., assignors to Eastman Kodak Company, Rochester, N.Y., a corporation of New Jersey
No Drawing. Filed Aug. 1, 1957, Ser. No. 675,560
10 Claims. (Cl. 44—62)

This invention relates most especially to the unexpected discovery that a particular class of known nitrogenous copolymers and certain known antioxidants function as a synergistic combination when incorporated in gasoline containing tetra-ethyl lead thereby greatly retarding the normal formation of lead haze or precipitate. This invention also pertains to the unobvious discovery that this same result can also be obtained to a surprisingly effective although less pronounced degree using a much broader known class of nitrogenous copolymers.

The first aspect of this invention relates to the discovery of the new combination of (1) gasoline, (2) tetraethyl lead, (3) a gasoline soluble nitrogenous addition polymer including a pyridine component, and (4) a phenolic gasoline antioxidant.

A second aspect of this invention relates to the discovery of another somewhat similar new combination of (1) gasoline, (2) tetraethyl lead, and (3) a gasoline soluble nitrogenous addition polymer not necessarily including a pyridine component.

Component (3) of the second combination is generic to component (3) of the first.

None of the known prior art has achieved the unexpectedly efficacious results obtained in accordance with either aspect of the present invention.

Prior art of remote pertinence is quite prolific with disclosures relating to various polymeric additives for fuel oil, lubricating oil, lubricants and the like, none of which contain a tetra-alkyl lead compound which creates special problems in gasoline relating to lead haze or precipitate. The art clearly recognizes that fuel oil is quite distinct from lubricating oil and lubricants; in fact, many patents have obviously been granted based in large measure upon the inability to predict that an additive valuable in one of these substrates will be valuable in the other. Even greater differences exist between gasoline on the one hand and either fuel oils or lubricating oils on the other hand.

The problems relating to lead haze formation and lead precipitation in high octane automotive and aviation gasolines have long been without satisfactory solution in the industry. Haze and precipitate formation result in loss of octane value and then tend to form deposits which plug engine and manifold parts, e.g. filters, carburetor, intake valves, etc. Numerous patents and publications of all kinds describe various additives which reduce these problems to some extent. Among the most appropos of such prior art is a disclosure that polymerized alpha-beta unsaturated esters useful as gasoline additives for such a purpose include polymerized esters of acrylic acid, methacrylic acid, fumaric acid, maleic acid, itaconic acid and mesaconic acid as well as polymerized vinyl esters of fatty acids, any of which polymers should have a molecular weight of 2,000 to 30,000 or higher and should be soluble in gasoline. Another disclosure in the prior art indicates that tetraethyl lead can be stabilized with certain polymerized unsaturated acid esters including copolymers such as derived from decyl maleate and vinyl acetate.

It was quite unexpected to find that a particular class of known nitrogenous copolymers useful in some instances in fuel oils and in other instances in lubricating oils would have a quite different but useful function in gasoline containing a tetra-alkyl lead compound. The known uses for such nitrogenous copolymers in fuel oils relate to the prevention of sludge formation resulting from the polymerization of asphaltenes and maltenes which are contained in the fuel oil initially. The sludge is not carbonaceous and usually contains a considerable amount of nitrogenous material. Lubricating oil consists almost entirely of high molecular weight saturated hydrocarbons while fuel oil is of lower molecular weight range and contains aromatic and unsaturated hydrocarbons as well as non-hydrocarbon material. The sludge formation in lubricating oil is largely the result of high temperature oxidation or cracking reactions and consists mainly of carbonaceous material. It is clearly apparent that great differences exist between sludge formation in fuel oils and lubricating oils and that neither of these substrates involves the problems associated with lead haze or precipitates in gasoline containing a tetra-alkyl lead compound.

Although many patents in the prior art describe polymers useful for inhibiting deterioration of fuel oils or lubricating oils only a particular class of these known additives is contemplated within the scope of the present invention as defined herein. Of the few patents disclosing members the class of copolymers covered by this invention, particular reference can be made to U.S. Patents 2,737,452, 2,737,496, 2,666,044; however, although numerous examples contained in these patents serve to illustrate many of the copolymers defined below as component (E) of this invention, it is to be noted that component (E) encompasses a broader range of copolymers which in itself may be surprising since some of them are acknowledged by the enumerated prior art to be practically useless in fuel oil or in lubricating oil.

Applications filed by one of the applicants relating to fuel oil sludge inhibition include Lappin and Shields Ser. No. 454,214 filed September 3, 1954, now abandoned, which concerns the use of the homopolymer of N-oleyl acrylamide, and Lappin and Shields Ser. No. 454,215, now abandoned, which concerns the use of copolymers of 50–90% by weight of an ester of an aliphatic mono-ethylenic carboxylic monoacid or diacid of 3 to 5 carbon atoms and a saturated aliphatic alcohol of 8–24 carbon atoms, such as lauryl methacrylate, and an amino amide of an aliphatic mono-ethylenic carboxylic acid of 3 to 5 carbon atoms, such as N-(3-dimethylaminopropyl)acrylamide. The latter application illustrates species of the below defined component (E) of this invention.

A disclosure in the prior art further illustrating the unobviousness of the present invention provides a perfluorocarboxylic acid salt of a species of the copolymers of component (E) of this invention as lubricating oil additives whereby the resultant lubricating oil is beneficial in promoting the scavenging of deposits in internal combustion engines such as caused by tetra-ethyl lead in spark ignition engines. This prior art disclosure would render it quite unobvious to suspect that the formation of the harmful deposits could be retarded by using the disclosed copolymers as additives to gasoline containing the tetra-ethyl lead, rather than using the perfluorocarboxylic acid salts of the copolymers as scavenging agents after the harmful deposits had already been formed. Moreover, it is well known that halogen-containing compounds are useful as scavenging agents for tetra-ethyl lead decomposition products, whereas nitrogenous copolymers not necessarily containing any halogen substituents would not be supposed to have any value in retarding lead haze or precipitate formation.

It is apparent from the preceding discussion what several objects of this invention contemplate.

It is an object of this invention to provide a leaded gasoline composition which represents a unique combination of components admirably suited for use as motor fuels which have greatly improved qualities with respect to lead haze or precipitate formation.

It is also an object of this invention to provide a leaded gasoline composition which has similar properties and further possesses greatly improved stability as regards all phases of oxidative deterioration, e.g. gum formation, discoloration, etc. as a result of a most unobvious synergistic effect.

These and other objects which will become apparent elsewhere herein can be accomplished in accordance with a principal embodiment of this invention which provides an improved motor fuel comprising (A) gasoline, (B) tetraethyl lead in an amount sufficient to raise the octane rating of the motor fuel, (C) at least 0.001% by weight of a gasoline-soluble addition-type copolymer of (1) from 50 to 90 mole percent of an alkyl ester of an aliphatic monoethylenic carboxylic acid containing from 3 to 5 carbon atoms wherein each alkyl radical contains from 8 to 24 carbon atoms, and (2) from 10 to 50 mole percent of a monoethylenic copolymerizable compound containing a basic amino nitrogen radical as a side group, which copolymer contains from 0.1 to 7.0% by weight of basic amino nitrogen.

According to this embodiment of the invention there need not necessarily be present any gasoline antioxidant since the above-defined component (C) serves primarily to stabilize against lead haze or precipitate as discussed above. Of course, antioxidants can be present as well as any other additives which may be desirable such as lead scavengers, dyes, etc.

According to another embodiment of this invention there is provided an improved motor fuel comprising (A) gasoline, (B) tetraethyl lead, (E) at least 0.001% by weight of a gasoline soluble addition-type copolymer of (1) from 50 to 90 mole percent of an alkyl ester of an aliphatic monoethylenic carboxylic acid containing from 3 to 5 carbon atoms wherein each alkyl radical contains from 8 to 24 carbon atoms, and (2) from 10 to 50 mole percent of a pyridine derivative having the formula:

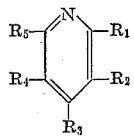

wherein one of the R substituents represents a vinyl radical and each of the other R substituents represents a member selected from the group consisting of a hydrogen atom and a 1–6 carbon alkyl radical, which copolymer contains from 0.2 to 7.0 percent by weight of basic amino nitrogen, and (D) at least 0.001% by weight of an alkylated phenolic gasoline antioxidant having the following formula:

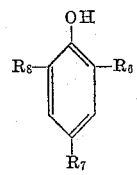

wherein each of $R_6$ and $R_8$ represents a substituent selected from the group consisting of a hydrogen atom and a 1–8 carbon alkyl radical, and $R_7$ represents a substituent selected from the group consisting of a 1–8 carbon alkyl radical, an $NH_2$-radical, a $-NHR'$ radical and an $-NR'R''$ radical wherein each $R'$ and $R''$ represents a 1–8 carbon alkyl radical, the proportionate amounts of said antioxidant (D) to said copolymer (E) ranging from about 95% antioxidant/5% copolymer to 20% antioxidant/80% copolymer.

The latter embodiment encompasses the synergistic combination of phenolic gasoline antioxidants and gasoline soluble copolymers containing a certain class of pyridine derivatives.

Further embodiments of this invention relate to tetraalkyl lead compositions containing component (C) or components (D) and (E). Component (C) is generic to component (D). These tetraalkyl lead compositions are intended as stabilizing additives for motor fuels prepared from gasoline.

The gasoline referred to above as component (A) include many of the gasolines which are manufactured for either automotive or aviation engines. These gasolines may be blended from various stocks obtained from conventional products and treating processes such as the following: catalytically cracked, catalytically reformed, thermally cracked, thermally reformed, straight run, polymer, alkylate hydrogenated, natural, etc. These gasolines may involve combinations or blends such as Pennsylvania catalytically plus thermally cracked gasoline. Those familiar with the art pertaining to gasolines are well acquainted with the numerous varieties of gasoline. The various types of gasoline are subject to oxidative deterioration through contact with air during production, storage and use. Gasolines are quite commonly produced with the intention that additives will be introduced to accomplish various objectives. One of the most common additives is tetraethyl lead. Various types of antioxidants are commonly added to gasoline to retard oxidation. The employment of antioxidants is generally desired to reduce the deterioration caused by oxidation resulting in objectionable products which include peroxides, gums, discoloration, off odor, etc. However, those gasolines which include tetraethyl lead are subject to additional problems caused by the deterioration of the tetra ethyl lead compound to form haze and precipitation. Such objectionable degradation products in leaded gasoline are generally referred to as lead haze or precipitate. The various deterioration products are harmful since they result in loss in octane value and they tend to form deposits which plug engine and manifold parts such as filters, carburetor, intake valves, etc.

The tetraethyl lead of component (B) as set forth hereinabove is such a well known additive for gasoline that little need be said as to its function or use. It is employed in conjunction with gasoline as an additive for improving octane rating, etc. Although tetraethyl lead is the additive generally employed, other tetra-alkyl lead compounds are also the equivalents. Tetraethyl lead is often added to commercial gasolines in the form of what are referred to as tetraethyl lead mixes. Ethylene dichloride and ethylene dibromide are commonly used as lead scavengers in tetraethyl lead mixtures, but other suitable halogenated organic scavengers may be employed. The present invention contemplates not only gasoline containing the various components set forth hereinabove, but also other additives such as dyes, methyl deactivators, anti-icing fluid, engine deposit modifiers, anti-corrosion additives as well as the numerous types of anti-oxidants, etc. As is clearly apparent the present invention relates primarily to premium quality motor gasolines which are produced by blending various gasolines such as Platformate plus catalytically cracked gasoline containing 3 ml. of tetraethyl lead per gallon. Representative of aviation gasoline would be a 115/145 octane aviation gasoline containing 4.6 ml. of tetraethyl lead per gallon.

The copolymer referred to above as component (C) represents one or more of those copolymers of the defined type which are reasonably well described in numerous patents, some of which have been referred to hereinabove. These copolymers or mixtures of copolymers include those derived from at least two starting materials which have been carefully designated hereinabove. However, the copolymer component contemplated by this invention can be produced from three or more starting materials when it is desired to incorporate some other polymerizable monomer which will serve as an extender or modifier for the purpose of accomplishing some further objective as when it might be desirable to reduce costs. Such copolymers are obviously equivalent to those more specifically contemplated according to the preferred embodiments of this invention.

The first component of the copolymer designated as (C) covers various unsaturated acid esters but more particularly contemplates preferred compounds which include the esters of acrylic or methacrylate acids. A particularly preferable monomer of this type is lauryl methacrylate.

The ester component of the copolymers embodying this invention can be any of the esters of an aliphatic monoethylenic monocarboxylic or dicarboxylic acid of 3–5 carbon atoms and a saturated aliphatic alcohol of 8–24 carbon atoms. Such esters are well known in the art, and any of the esters as defined herein are suitable for use in practicing the invention. Thus, for example, the ester can be an ester of a monocarboxylic acid of the formula

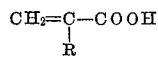

in which R is either hydrogen or methyl, such as an ester of acrylic acid or methacrylic acid. Similarly, the ester which is employed can be an ester of an aliphatic monoethylenic dicarboxylic acid, and particularly the dicarboxylic acids containing 4–5 carbon atoms, such as itaconic acid. The dicarboxylic acid esters which are preferably employed are the esters of acids of the formula

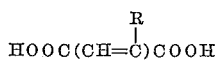

wherein R is either hydrogen or a methyl group. Such preferred diesters include the esters of maleic acid, fumaric acid, and citraconic acid.

As defined herein, such monoethylenic aliphatic acids are esterified with a saturated aliphatic alcohol of 8–24 carbon atoms. Thus, for example, the ester can be an ester of any of the well known saturated aliphatic alcohols as defined, including 2-ethylhexyl alcohol, octyl alcohol, lauryl alcohol, octyl-decyl alcohol, cetyl-stearyl alcohol, and the like. Thus, suitable esters for use in preparing the copolymer additives embodying this invention include lauryl acrylate, lauryl methacrylate, 2-ethylhexyl acrylate, 2-ethylhexyl methacrylate, octyl acrylate, octyl methacrylate, octyl-decyl acrylate, octyl-decyl methacrylate, cetyl-stearyl acrylate, cetyl-stearyl methacrylate, lauryl fumarate, lauryl maleate, 2-ethylhexyl fumarate, 2-ethylhexyl maleate, and similar long chain alkyl esters of unsaturated aliphatic acids of 3–5 carbon atoms, including the corresponding itaconates and citraconates. In preparting the copolymers of this invention, these and similar esters may be used singly or in combinations of two or more of such esters for copolymerization with the N-comonomers as defined herein. In the preferred copolymers, such esters amount to 50–90% by weight of the total copolymer weight, although smaller amounts can be used in some cases. The ester monomer can be substantially a pure compound, or it can be a mixture of esters derived from a single acid and a mixture of alcohols or derived from two or more acids with one or more alcohols. Thus, for example, the dicarboxylic acids can be esterified with a mixture of alcohols to give mixed esters as desired.

Although many of these esters, as well as others of similar properties are suitable for the preparation of the copolymers designated above as component (C) and are, in fact, equivalent as to the effectiveness of the copolymer so obtained; however, for reasons of cost and especially advantageous physical properties it is generally preferred to use lauryl methacrylate as the component.

It is to be noted that the first component of the copolymer is defined in the same manner for the copolymer designated as component (C) as it is for the copolymer designated as component (E). The second component of the copolymer (C) covers a group of compounds defined in a manner which is generic to the second component of copolymer (E). Thus, the second component of copolymer (E) is illustrative of one of the species coming within the scope of the second component of copolymer (C).

As the second component of the copolymer defined above as (E) it is ordinarily preferred for reasons of cost and good physical properties to use 2-methyl-5-vinylpyridine. However, other pyridine compounds which can be employed include 5-vinylpyridine, 2-vinylpyridine, 2-butyl-5-vinylpyridine, 4-vinylpyridine, etc.

The pyridine derivatives just named illustrate compounds which can be used as the second component in preparing the copolymer defined above as component (E) and also in preparing the copolymer defined above as component (C). Other components which can be used in the preparation of the copolymer defined above as component (C) are illustrated by polymerizable amino esters such as 2-dimethylaminoethyl methacrylate, 2-dimethylaminoethyl acrylate, polymerizable amino-amides such as N-(3-dimethylaminopropyl)acrylamide, N-(3-diisopropylaminopropyl)acrylamide, polymerizable amides such as N-isopropylacrylamide, N,N-diethylacrylamide, methacrylamide, methacrylanilide, acrylamide and many other compounds of the type defined including p-amino styrene, 4-(β-methylyloxyethyl) morpholine, vinyl-N,N-dibutylthiocarbamate.

It is apparent that the compounds named as illustrative are not intended to imply any limitation upon the scope of the compounds which can be employed.

A particularly preferred group of polymers coming within the scope of component (C) can be prepared from lauryl methacrylate polymerized with any one or a mixture of 2-diethylaminoethyl methacrylate, 3-dimethylaminopropyl methacrylate, or 2-methyl-5-vinylpyridine.

In order to extensively illustrate nitrogenous monomers the following tabulation is presented.

N-CONTAINING MONOMERS

Polymerizable amino-esters such as:
    2-dimethylaminoethyl acrylate
    2-diethylaminoethyl acrylate
    2-di(n-butylamino)ethyl acrylate
    2-dicyclohexylaminoethyl acrylate
    3-dimethylaminopropyl acrylate
    2-(diethylamino)cyclohexyl acrylate
    2-dimethylaminoethyl methacrylate
    2-diethylaminoethyl methacrylate
    2-di(n-butylamino)ethyl methacrylate
    2-dicyclohexylaminoethyl methacrylate
    2-(diethylamino)cyclohexyl methacrylate
    3-dimethylaminopropyl methacrylate
Polymerizable amino-amides such as:
    N-3-(dimethylamino)propyl acrylamide
    N-3-(diethylamino)propyl acrylamide
    N-3-(diisopropylamino)propyl acrylamide
    N-3-(ethylamino)propyl acrylamide
    N-3-(dimethylamino)propyl methacrylamide
    N-3-(diethylamino)propyl methacrylamide
    N-3-(diisopropylamino)propyl methacrylamide
    N-3-(ethylamino)propyl methacrylamide
Polymerizable amides such as:
    N-methylacrylamide
    N-isopropylacrylamide
    N-hexylacrylamide
    N-decylacrylamide
    N-tetradecylacrylamide
    N-octadecylacrylamide
    N,N-dimethylacrylamide
    N-cyclohexylacrylamide
    N-phenylacrylamide
    Acrylamide
    N-methylmethacrylamide
    N-isopropylmethacrylamide
    N-hexylmethacrylamide N-decylmethacrylamide
N-tetradecylmethacrylamide
N-octadecylmethacrylamide
N,N-dimethylmethacrylamide
N-cyclohexylmethacrylamide
N-phenylmethacrylamide
N-p-tolylmethacrylamide
Methacrylamide Polymerizable amines such as:
2-vinyl pyridine
4-vinyl pyridine
2-methyl-5-vinyl pyridine
4-($\beta$-methacrylyloxyethyl)morpholine Other N-containing monomers: Vinyl-N,N-dibutyldithiocarbamate Other nitrogenous monomers can also be employed and are illustrated in various patents of the prior art such as those mentioned above.

As already discussed, a third or fourth component can be employed in the preparation of the copolymers defined above as component (C) or component (E). For example, a copolymer can be prepared from lauryl methacrylate, 2-methyl-5-vinylpyridine and a third comonomer which is preferably chosen from the class nitrogen containing derivatives of polymerizable unsaturated acids such as N-methylacrylamide, N-isopropylacrylamide, N-(3-dimethylaminopropyl) acrylamide, 2-dimethylaminoethylacrylamide, 3-diethylaminopropyl methacrylate, etc. The choice of the third comonomer, or whether such third copolymer is used at all will depend on the exact properties desired in the copolymer. In some instances the addition of 5 to 10% of such a third comonomer may increase the effectiveness of the additive copolymer but also increases its cost. The named third comonomers and homologs thereof have been found to be effective for improving the copolymers defined above as component (E). Thus, if the copolymer is to be used in a gasoline which is just only moderately susceptible to deterioration such a third comonomer may not be needed to contribute additional improvement to the stability of the gasoline composition contemplated by this invention. However, for a gasoline of fairly high instability, particularly cracked stocks, or under drastic conditions of use as when exposure to sunlight is quite likely or high temperatures may be experienced the use of the more effective and more costly third comonomer may be highly desirable.

The copolymers embodying the invention can be readily prepared by any of the well known polymerization practices, including emulsion polymerization, solution polymerization, and mass polymerization. If desired, the polymerization can be carried out in aqueous emulsion, but it is generally desirable to polymerize the monomeric components in solution in a solvent which is miscible with gasoline, whereby the resulting polymerization mixture can be employed directly for addition to the gasoline without the necessity of isolating the copolymer therefrom. Thus, the polymerization can be carried out in a reaction medium consisting of gasoline itself, Stoddard solvent or other similar petroleum fraction, or in an aromatic hydrocarbon such as benzene or toluene. The polymerization is facilitated in accordance with usual practice by the use of a suitable polymerization catalyst such as a peroxy catalyst, or desirably a catalyst such as 2,2'-azodiisobutyronitrile. The polymerization is readily carried out at slightly elevated temperatures such as a temperature of 60–70° C. for a period of from 4 to 40 hours, or until polymerization is complete. The preparation of copolymers is well known in the art and hence is not described in great detail herein.

The copolymer (C) or (E) additives embodying the invention are effective when employed in an amount of about 0.001% by weight based on the weight of the gasoline being stabilized, and are generally employed in the range of 0.001% to 0.10% by weight. The preferred range of concentration of the additive is 0.003% to 0.02% by weight. Larger amounts can be employed but are usually undesirable from the economic standpoint, and the amount of additive is usually minimized to prevent adverse effects from the additive during combustion. The additives can be employed in stabilizing any of the gasolines but are of particular utility in stabilizing the cracked gasolines. They can be used alone or in combination with antioxidants, metal deactivators, anticorrosion agents, and similar additives which are employed for different purposes.

The preparation of a typical copolymer embodying the invention is illustrated by the following example. It will be understood that any of the other copolymers as described herein can be prepared in similar fashion in the same or different proportions within the ranges herein defined, and that the copolymers can also be prepared in other ways such as are well known in the art.

EXAMPLE

A solution of 5 g. of lauryl methacrylate, 5 g. of N-(3-dimethylaminopropyl)acrylamide, and 20 ml. of a 0.1% Stoddard-solvent solution of 2,2'-azodiisobutyronitrile was heated at 70° C. for 48 hours. The resulting viscous solution of copolymer was used without further treatment. If desired, the copolymer can be isolated from the polymerization medium before addition to the gasoline, although it is conveniently employed directly in solution in the solvent.

As already discussed, the copolymers defined as component (C) are quite effective for reducing the formation of lead haze or precipitate in both the presence and absence of conventional antioxidants. However, in general, the copolymers defined as component (C) have no antioxidant value in that they do not retard oxidation of the gasoline as measured by formation of gum during storage. In other words, they are capable of effectively retarding the formation of lead haze or precipitate but they are not generally effective in retarding the normal course of gasoline oxidative deterioration. The one exception was found to exist for those copolymers defined above as component (E) provided that the component (E) is employed in conjunction with an alkylated phenolic gasoline antioxidant defined above as component (D). Thus, components (D) and (E) act synergistically to retard both lead haze or precipitate and gum formation to a much greater degree than the added effects of the separate components (D) and (E). This synergistic effect was quite surprising and clearly distinguishes this aspect of the invention.

Illustrative of the alkylated phenolic gasoline antioxidants are p-butylaminophenol; p-methylaminophenol; p-propylaminophenol; p-isobutylaminophenol; p-octylaminophenol; p-dimethylaminophenol; p-dibutylaminophenol; p-butylmethylaminophenol; p-aminophenol; 2,6-di-tertiarybutyl-cresol; 2,4-dimethyl-6-tertiarybutylphenol; 2,6-ditertiarybutylphenol; 2,4-xylenol; 2,4,6-trimethylphenol; 2,6-ditertiarybutyl-5-ethylphenol; p-nonylphenol; 2,2'-ethylenebis(6-tertiarybutyl-p-cresol) and other similar compounds including homologs or isomers or mixtures of any of the above.

The preferred antioxidants defined as component (D) are p-butylaminophenol and 2,6-ditertiarybutyl-p-cresol. These compounds are preferred for reasons of cost and good physical and chemical characteristics. Both of these compounds are commercially available. The second of these compounds is also called 2,6-ditertiarybutyl-4-methylphenol or butylated hydroxytoluene (BHT).

As mentioned above the copolymer additives defined as (C) or (E) can be advantageously added in a concentration of by weight of from 0.001% up to 0.1%. In terms of pounds of copolymers per thousand barrels of gasoline this represents a rage from about 3 pounds to 250 pounds. It is quite unlikely that more than 50 pounds would ever be employed although there are circumstances where as little as 1 pound might be adequate per thousand barrels of gasoline. The copolymers are compatible with other additives such as dyes, metal deactivators, corrosion inhibitors, pre-ignition control additives, etc. These copolymers may be added to the gasoline as such or they can be added as solutions in solvents such as the polymerization medium mentioned above or they can be added in solution along with a tetraethyl lead mix which is also present in the solution.

This invention contemplates a stabilizing composition suitable for addition to gasoline comprising a suitable hydrocarbon solvent containing a high concentration of tetraethyl lead and a high concentration of component (C) or of components (D) plus (E). Such a composition can be considered as a new and improved tetraethyl lead mix and can be compounded in appropriate proportions for addition to the various grades and kinds of gasolines having a wide variety of different requirements. The tetraethyl lead is normally employed along with an organic halogenated compound. Automotive gasolines ordinarily contain up to about 3 ml. of tetraethyl lead per gallon while aviation gasolines ordinarily contain up to about 4.6 ml. per gallon. These quantities refer to the tetraethyl lead itself and not to the volume of lead mix. Lead mixes are generally compounded so as to provide about 2 atoms of chlorine or bromine per lead atom, i.e., "1.5-T" mix indicates that the scavenger present is theoretically capable of reacting with 1.5 times the amount of lead actually present. Scavengers which can be used include various halogenated alkyl and aromatic compounds such as those previously named as well as tertiarybutyl bromide, chlorobenzene, etc. The present invention contemplates the presence of a lead scavenger in the compositions covered by this invention although it is considered that the results achieved by this invention do not necessarily require the presence of a lead scavenger. As has been made quite clear this invention seeks to achieve elimination or marked reduction in the formation of lead haze or precipitate which is a problem entirely different from that encountered in hydrocarbon compositions which do not contain tetraethyl lead.

The limitations upon the nitrogen content of the copolymers employed as components (C) and (E) according to this invention have been selected so as to cover the effective range thereby making the definition of the copolymers more precise and improving the ease with which those skilled in the art can understand the scope of this invention. These limitations of the nitrogen content make it evident that considerably more nitrogen can be advantageously present in the copolymers employed in accordance with this invention than can be tolerated in the stabilizations of hydrocarbon and lubricating oils.

The copolymers of component (C) or (E) must quite obviously be gasoline soluble, which property is most advantageously achieved by preparing these copolymers in a solvent which is miscible with gasoline. While the degree of polymerization is quite flexible the copolymers should not be too highly polymerized since this will reduce the solubility. Of course, in some applications where the amount of copolymer required to dissolve in the gasoline is quite low the degree of solubility need not be very high.

The relative amounts of copolymer component (E) and gasoline antioxidant component (D) that comprise useful mixtures may vary from about 95% antioxidant/5% copolymer to 20% antioxidant/80% copolymer. It is generally preferred to use mixtures in a range from about 40 to 80% antioxidant and 60 to 20% copolymer. The concentration of such a copolymer/antioxidant mixture which can be advantageously added to leaded gasoline will depend upon the inherent stability of the gasoline and the desired degree of stability. Generally, concentrations of from 0.1 to 100 pounds per one thousand barrels of gasoline will be useful. A preferred concentration range is from 1 to 50 pounds per one thousand barrels. The antioxidant and the copolymer may be added separately or as a mixture. Each component or the mixture may be dissolved in suitable solvents such as methanol, isopropanol, toluene, xylene, acetone, a petroleum fraction such as heptane, etc. These considerations are generally about the same as already discussed hereinabove.

The superior antioxidant action of the subject copolymer/antioxidant mixtures was demonstrated by lengthy storage tests in which various combinations of leaded gasoline, copolymer, and antioxidant were stored in capped, one-quart glass bottles at 110° F. in the dark. The bottles contained 700 ml. of gasoline and about 250 ml. of air. Periodically, the samples were examined for color, precipitate or haze, and ASTM gum content. ASTM gum is the amount of nonvolatile residue in the gasoline, in mg./100 ml., as determined by ASTM method D381–54T. The life of the gasoline was estimated as the time in weeks required to show a definite haze and to reach and ASTM gum content of 10 mg./100 ml.

The following examples and the table will serve to further illustrate the practice of this invention as it relates to the aspect of the invention including the presence of an antioxidant defined as component (D). It will be understood that these examples of certain preferred embodiments are included merely for purposes of illustration and are not intended to limit the scope of the invention unless otherwise specifically indicated.

EXAMPLE 1

A commercial tetraethyl lead motor mix was added to a blend of Pennsylvania catalytically cracked and thermally cracked gasolines to obtain a concentration of 3 ml. of TEL (tetramethyl lead) per gallon. Four 700-ml. portions were poured into one-quart bottles. One portion served as a control. To another was added 3.25 lb. of p-butylaminophenol/1000 bbl. of gasoline. To another portion was added 10 lb. of a copolymer of lauryl methacrylate/-2-methyl-5-vinylpyridine (70/30 weight percent)/1000 bbl. To the fourth was added 3.25 lb. of p-butylaminophenol and 10 lb. of the same copolymer/1000 bbl. The four gasoline samples were shaken, capped, and stored at 110° F. Periodically they were inspected and tested as outlined above. Table 1 shows the storage lives of these compositions as well as the life increase for each (life of treated sample—life of control).

Table 1

| Additive, lb./1,000 bbl. | Storage life, weeks | | Life increase over control, weeks | |
| --- | --- | --- | --- | --- |
| | To 10 mg. ASTM gum/ 100 ml. | To first haze | Gum | Haze |
| None (control) | 5 | 4 | | |
| 3.25 lb. p-butylaminophenol | 25.5 | 16 | 20.5 | 12 |
| 10-lb. copolymer of lauryl methacrylate/2-methyl-5-vinylpyridine (70-30 weight percent) | 6 | 12 | 1 | 8 |
| 3.25 lb. p-butylaminophenol plus 10 lb. of above copolymer | 45 | >46 | 40 | >42 |

It is seen that p-butylaminophenol, alone, increased both the gum and haze lives of the gasoline. The lauryl methacrylate/2-methyl-5-vinylpyridine copolymer did not significantly increase the gum life of the fuel but did prolong the haze life. However, the mixture of copolymer plus p-butylaminophenol provided a substantially longer protection than the sum of the separate effects of the two components (gum: 40 weeks for mixture vs. 21.5 weeks for separate components; haze: 42 weeks for mixture vs. 20 weeks for separate components).

EXAMPLE 2

This example illustrates that the same copolymer, lauryl methacrylate/2-methyl-5-vinylpyridine, acted synergistically with a different antioxidant, 2,6-di-tert-butyl-p-cresol. Portions of the same leaded gasoline of Example 1 were prepared and stored as above except that 2,6-di-tert-butyl-p-cresol was used instead of p-butylaminophenol. The higher effectiveness of the mixture is shown in the results in Table 2.

*Table 2*

| Additive, lb./1,000 bbl. | Storage life, weeks | | Life increase over control, weeks | |
|---|---|---|---|---|
| | To 10 mg. ASTM gum/ 100 ml. | To first haze | Gum | Haze |
| None (control) | 5 | 4 | | |
| 10 lb. 2,6-di-tert-butyl-p-cresol | 11 | 8 | 6 | 4 |
| 10-lb. copolymer of lauryl methacrylate/2-methyl-5-vinylpyridine (70/30 weight percent) | 6 | 12 | 1 | 8 |
| 10 lb. 2,6-di-tert-butyl-p-cresol plus 10 lb. of above copolymer | 25.5 | 31 | 20.5 | 27 |

EXAMPLE 3

This example shows that several other types of copolymers did not act synergistically with the two mentioned antioxidants in prolonging the gum and haze lives of the leaded gasoline. In these cases, the effect of the mixtures was very litle or no more than the sum of the two individual effects. The gasoline, preparation, and storage procedures were the same as in Example 1. The results are shown in Table 3.

*Table 3*

| Additive, lb./1,000 bbl. | Storage life, weeks | | Life increase over control, weeks | |
|---|---|---|---|---|
| | To 10 mg. ASTM gum/ 100 ml. | To first haze | Gum | Haze |
| None (control) | .5 | 4 | | |
| 3.25 lb. p-butylaminophenol | 25.5 | 16 | 20.5 | 12 |
| 10 lb. 2,6-di-tert-butyl-p-cresol | 11 | 8 | 6 | 4 |
| 10 lb. copolymer A [1] | 5 | 27 | 0 | 23 |
| 10 lb. copolymer B [2] | 7 | 27 | 2 | 23 |
| 3.25 lb. p-butylaminophenol plus 10 lb. of copolymer A [1] | 18 | 40 | 13 | 36 |
| 3.25 lb. p-butylaminophenol plus 10 lb. of copolymer B [2] | 26.5 | 45 | 21.5 | 41 |
| 10 lb. 2,6-di-tert-butyl-p-cresol plus 10 lb. of copolymer A [1] | 7.5 | 23 | 2.5 | 19 |
| 10 lb. 2,6-di-tert-butyl-p-cresol plus 10 lb. of copolymer B [2] | 7.5 | 23 | 2.5 | 19 |

[1] Copolymer A is lauryl methacrylate/2-dimethylaminoethyl methacrylate (75/25 weight percent).
[2] Copolymer B is lauryl methacrylate/N-(3-dimethylaminopropyl) acrylamide (75/25 weight percent).

As an example of the inactivity of the mixtures in Table 3, the compounds p-butylaminophenol and copolymer of lauryl methacrylate/2-dimethylaminoethyl methacrylate separately increased the gum life of the gasoline by 20.5 and 0 weeks respectively. The mixture of these two components increased the gum life only 13 weeks. In regard to haze prevention, these individual components increased the haze life by 12 and 23 weeks, while the mixture increased haze life by 36 weeks, which is about the sum of the individual values.

One of the peculiar elements surrounding the aspect of the invention covered by the preceding specific examples is the fact that the accelerated oxidation or oxygen bomb test was not useful for showing the superior effectiveness of these components in leaded gasoline. The improvement was discovered during gasoline storage tests. Of course, the improvement in storage stability is actually the object of adding these components to the gasoline. The peculiar phenomenon observed regarding the accelerated tests merely illustrates that the accelerated tests are not always directly representative of the results that will be achieved during normal usage.

The following additional examples will serve to illustrate the invention involving the combination of components (A), (B) and (C). Of course, these examples merely illustrate preferred embodiments of the invention and it is to be understood that these examples are included solely for purposes of illustration and are not intended to limit the scope of the invention unless otherwise specifically indicated.

The following examples were based on evaluation which comprises exposure of portions of leaded gasoline, with and without the subject copolymers, to storage at 110° F.

EXAMPLE 4

A commercial motor mix of tetraethyl lead fluid was added to a Pennsylvania catalytically plus thermally cracked gasoline to obtain a tetraethyl lead concentration of 3 ml. per gallon. A 600-ml. portion was placed in a 1-quart bottle as a control. To another 600-ml. portion in a similar bottle was added one of the subject copolymers consisting of 75 weight percent of lauryl methacrylate and 25 weight percent of 2-dimethylaminoethyl methacrylate (50 weight percent in Stoddard solvent), at a concentration of 10 pounds copolymer per 1000 barrels of gasoline. The bottles were sealed, placed in the 110° F. oven, and inspected and air-purged at frequent intervals. The control sample showed a definite haze and precipitate at three weeks while the copolymer-containing sample was still sparkling clear at 26 weeks.

EXAMPLE 5

This example shows the lead stabilizing value of a different copolymer in gasoline containing an antioxidant. The gasoline antioxidant N,N′-di-sec.-butyl-p-phenylene diamine was added to some of the leaded Pennsylvania gasoline of Example 4, at a concentration of 7.5 pounds per 1000 barrels. Two samples were poured in glass bottles, one serving as a control. To the other was added a copolymer prepared from 90 weight percent lauryl methacrylate and 10 weight percent dimethylaminopropyl acrylamide, at a concentration of 10 pounds per 1000 barrels. Both bottles were stored at 110° F. and examined as in Example 4. The antioxidant-containing control showed definite lead haze at 7 weeks, while the same composition to which the copolymer had been added was still entirely clear at 26 weeks.

EXAMPLE 6

The results of further 110° F. storage tests on various combinations of gasolines, lead stabilizing copolymers and antioxidants are shown in Table 4. It is evident that all of the copolymers shown are quite active in stabilizing lead.

EXAMPLE 7

This example illustrates the lead stabilizing value of the copolymers as indicated by actual measurement of the weight of the lead precipitates after storage of gasoline at 110° F. A sample of the leaded Pennsylvania gasoline of Example 4 showed a very heavy haze and precipitate after 10 weeks' storage, and the insoluble residue content was 4.6 mg. per 100 ml. of gasoline. In contrast the same fuel containing 12.5 pounds per 1000 barrels of a copolymer from 75 weight percent lauryl methacrylate and 25 weight percent 2-dimethylaminoethyl methacrylate was sparkling clear after the same storage and contained only 0.3 mg. insoluble residue per 100 ml. The insoluble residue from the control sample was analyzed and found to contain a high percentage of lead.

EXAMPLE 8

The ability of the subject copolymers to retard lightcatalyzed lead precipitate in gasoline is shown herein. Portions of the control and polymer-containing gasolines of Example 7 were exposed to bright sunlight. The control showed a definite haze after 1 hour exposure while the sample containing the lauryl methacrylate/2-dimethylaminoethyl methacrylate copolymer was still clear after 4 hours' exposure.

Table 3 also presents examples of the effect of combining components (A), (B) and (C) and serves to illustrate this aspect of the invention.

*Table 4*

STORAGE EVALUATION OF COPOLYMERS AS STABILIZERS FOR TETRAETHYLLEAD IN GASOLINE

| Copolymer (10 lb./1000 bbl. in gasoline) | Time to show visible haze in gasoline in 110° F. storage, weeks | | | | | |
|---|---|---|---|---|---|---|
| | In Penn. cat. + therm. crkd. gasoline (3 ml. TEL/gal.)—Antioxidant and concn. lb./1,000 bbl. | | | | In premium motor gasoline "A" (mainly platformate + cat. crkd.) (3 ml. TEL/gal.) | In 115/145 octane aviation gasoline (4.6 ml. TEL/gal.) |
| | None | 3.2 lb. p-n-butylaminophenol | 7.5 lb. N,N'-di-sec.-butyl-p-phenyl-enediamine | 10 lb. 2,6-di-tert-butyl-p-cresol | | |
| None | 3 | 15 | 7 | 7 | 3 | 10 |
| 75% lauryl methacrylate, 25% 2-dimethylaminoethyl methacrylate | >26 | >26 | >23 | 23 | 5 | ---------- |
| 75% lauryl methacrylate, 25% 3-dimethylaminopropyl acrylamide | >26 | >26 | >26 | 23 | 7 | 20 |
| 70% lauryl methacrylate, 30% 2-methyl-5-vinyl pyridine | 11 | >26 | >26 | >26 | 5 | ---------- |
| 75% lauryl methacrylate, 10% N-isopropyl acrylamide, 15% 2-methyl-5-vinyl pyridine | 20 | ---------- | ---------- | ---------- | ---------- | ---------- |

Although the invention has been described in considerable detail with reference to certain preferred embodiments thereof, it will be understood that variations and modifications can be effected without departing from the spirit and scope of the invention as described hereinabove and as defined in the appended claims.

We claim:

1. An improved motor fuel for internal combustion engines consisting essentially of (A) gasoline, (B) tetraethyl lead in an amount sufficient to raise the octane rating of the motor fuel, (E) from about 0.001% to about 0.1% by weight of a gasoline soluble addition-type copolymer consisting essentially of (1) from 50 to 90 mole percent of an alkyl ester of an aliphatic monoethylenic carboxylic acid containing from 3 to 5 carbon atoms wherein each alkyl radical contains from 8 to 24 carbon atoms, and (2) from 10 to 50 mole percent of a pyridine derivative having the formula:

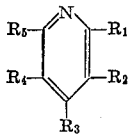

wherein one of the R substituents represents a vinyl radical and each of the other R substituents represents a member selected from the group consisting of a hydrogen atom and a 1–6 carbon alkyl radical, which copolymer contains from 0.2 to 7.0 percent by weight of basic amino nitrogen, and (D) from about 0.001% to about 0.1% by weight of an alkylated phenolic gasoline antioxidant having the following formula:

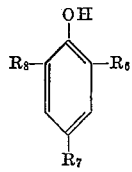

wherein each of $R_6$ and $R_8$ represents a substituent selected from the group consisting of a hydrogen atom and a 1–8 carbon alkyl radical, and $R_7$ represents a substituent selected from the group consisting of a 1–3 carbon alkyl radical, a —NHR' radical and an —NR'R'' radical wherein each R' and R'' represents a 1–8 carbon alkyl radical, the proportionate amounts of said antioxidant (D) to said copolymer (E) ranging from about 95% antioxidant/5% copolymer to 20% antioxidant/80% copolymer, said components (D) and (E) exhibiting synergism in motor fuels for internal combustion engines which contain component (B), said synergism residing in synergistically improved resistance to the formation of lead haze and gum.

2. The motor fuel as defined in claim 1 wherein the ester (1) of copolymer (E) is lauryl methacrylate.

3. The motor fuel as defined in claim 1 wherein copolymer (E) is a copolymer of lauryl methacrylate and 2-methyl-5-vinyl-pyridine.

4. The motor fuel as defined in claim 3 wherein the antioxidant (D) is 2,6-ditertiarybutyl-p-cresol.

5. The motor fuel as defined in claim 3 wherein the antioxidant (D) is p-butylaminophenol.

6. An improved tetra-alkyl lead mixture adapted for addition to a gasoline motor fuel to raise the octane rating thereof consisting essentially of the following components dissolved in a liquid petroleum hydrocarbon at a high concentration limited by what can be dissolved therein: (a) a tetraalkyl lead compound capable of raising the octane rating of a gasoline motor fuel, (b) an organohalogen scavenger for said tetra-alkyl lead (c) a gasoline-soluble addition-type copolymer consisting essentially of (1) from 50 to 90 mole percent of an alkyl ester of an aliphatic monoethylenic carboxylic acid containing from 3 to 5 carbon atoms wherein each alkyl radical contains from 8 to 24 carbon atoms, and (2) from 10 to 50 mole percent of a pyridine derivative having the formula:

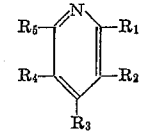

wherein one of the R substituents represents a vinyl radical and each of the other R substituents represents a member selected from the group consisting of a hydrogen atom and a 1–6 carbon alkyl radical, which copolymer contains from 0.2 to 7.0 percent by weight of basic amino nitrogen and (d) an alkylated phenolic gasoline antioxidant having the following formula:

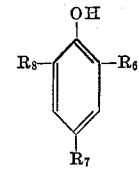

wherein each of $R_6$ and $R_8$ represents a substituent selected from the group consisting of a hydrogen atom and a 1–8 carbon alkyl radical, and $R_7$ represents a substituent selected from the group consisting of a 1–3 carbon alkyl radical, a —NHR' radical and an —NR'R'' radical wherein each R' and R" represents a 1-8 carbon alkyl radical, the proportionate amounts of said antioxidant (d) to said copolymer (c) ranging from about 95% antioxidant/5% copolymer to 20% antioxidant/80% copolymer, said components (d) and (c) exhibiting synergism in motor fuels for internal combustion engines which contain component (a), said synergism residing in synergistically improved resistance to the formation of lead haze and gum.

7. The lead mixture as defined by claim 6 wherein the ester (1) of copolymer (c) is lauryl methacrylate.

8. The lead mixture as defined by claim 6 wherein the ester (1) of copolymer (c) is a copolymer of (1) lauryl methacrylate and (2) 2-methyl-5-vinylpyridine.

9. The lead mixture as defined by claim 8 wherein antioxidant (d) is 2,6-ditertiarybutyl-p-cresol.

10. The lead mixture as defined by claim 8 wherein antioxidant (d) is p-butylaminophenol.

References Cited in the file of this patent

UNITED STATES PATENTS

| | | |
|---|---|---|
| 2,345,296 | Schulze | Mar. 28, 1944 |
| 2,469,737 | McNab | May 10, 1949 |
| 2,737,452 | Catlin et al. | Mar. 6, 1952 |
| 2,737,496 | Catlin | Mar. 6, 1956 |